UNITED STATES PATENT OFFICE.

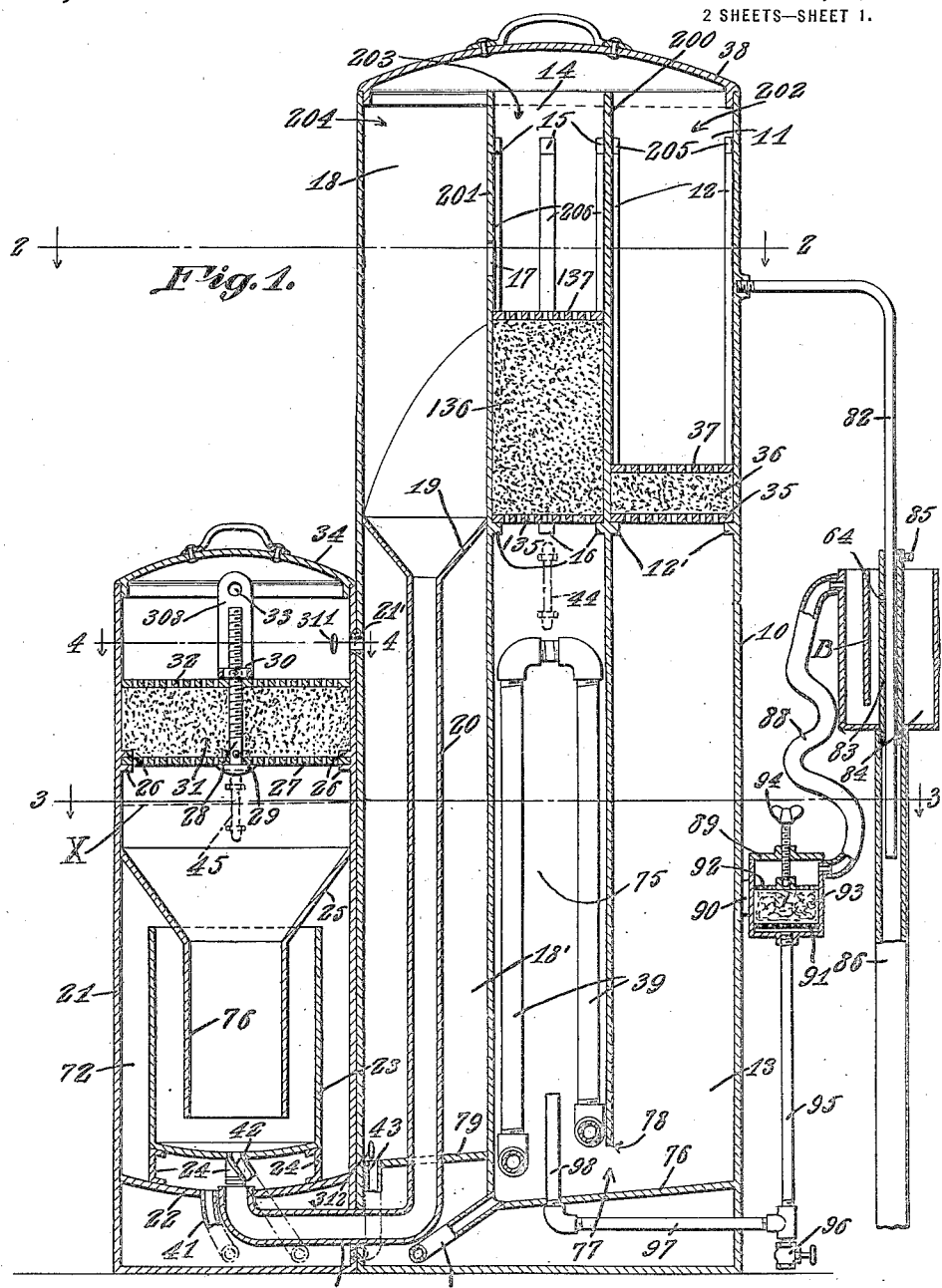

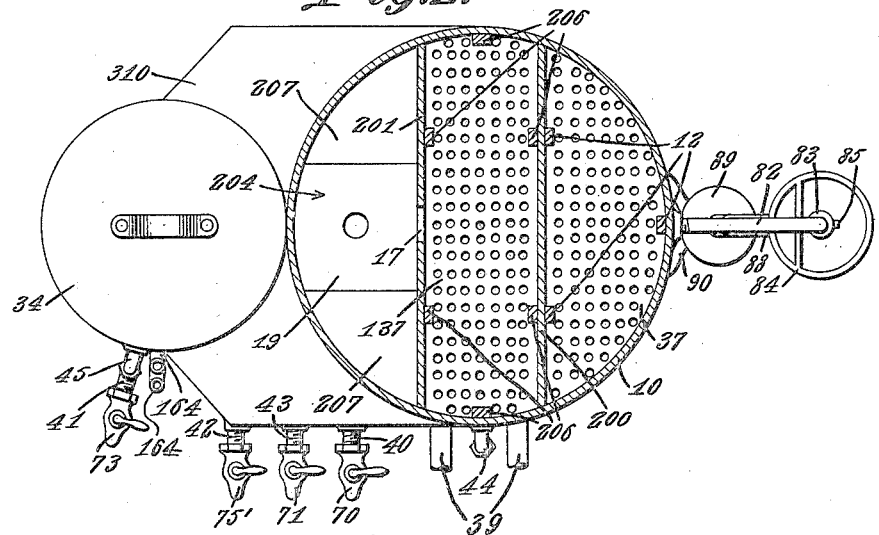
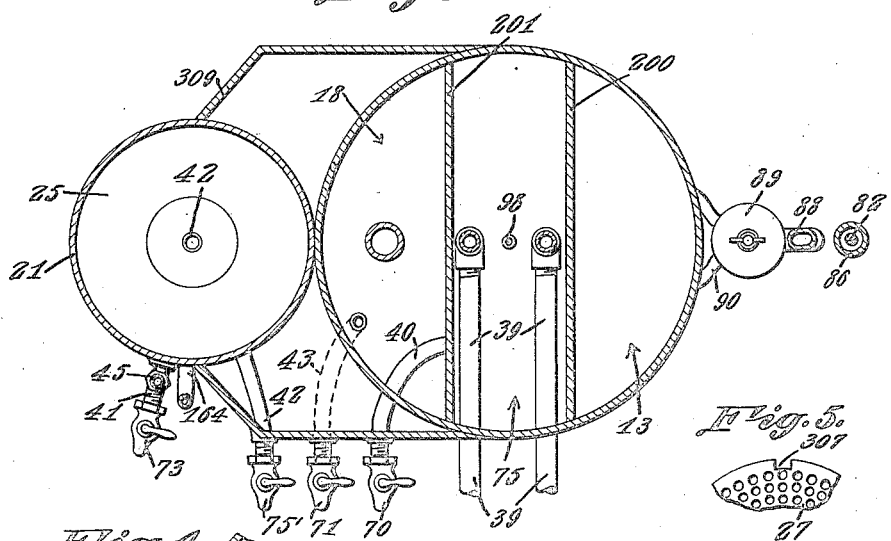
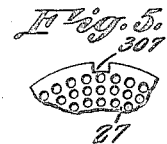
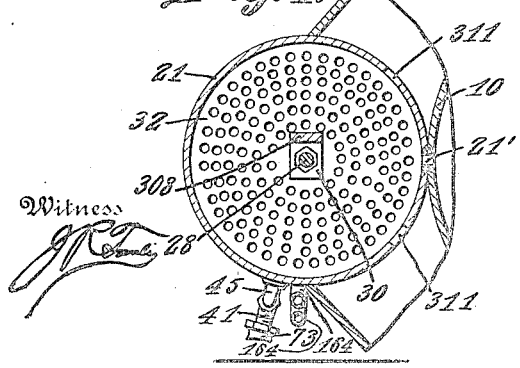

JOHN H. PACKER, OF LIBERTY, MISSOURI.

OIL-FILTER.

1,346,244.

Specification of Letters Patent.   Patented July 13, 1920.

Application filed May 7, 1919. Serial No. 295,333.

*To all whom it may concern:*

Be it known that I, JOHN H. PACKER, a citizen of the United States, residing at Liberty, in the county of Clay and State of Missouri, have invented a new and useful Oil-Filter, of which the following is a specification.

It is the object of this invention to provide novel means whereby oil of any kind may be washed and filtered, after having been used, so that the oil may be again employed as a lubricant or otherwise. The invention aims to provide novel mechanism for washing and filtering the oil, for drawing off sediment, and for storing the filtered oil.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts remaining in elevation, and sundry elements being indicated diagrammatically; Fig. 2 is a cross section on the line 2—2 of Fig. 1; Fig. 3 is a cross section on the line 3—3 of Fig. 1; Fig. 4 is a cross section on the line 4—4 of Fig. 1; Fig. 5 is a fragmental top plan showing a portion of one of the screens in the filters; and Fig. 6 is a fragmental vertical section.

In carrying out the invention there is provided a tank 10 closed at its upper end by a removable lid 38. Located within the tank 10 and extended longitudinally thereof are vertical partitions 200 and 201, defining compartments 202, 203 and 204 in the tank. The partition 201 extends downwardly to an inclined bottom 76 in the tank 10, a bottom 79 extending between the intermediate portion of the partition 201 and the adjacent side wall of the tank 10. The lower edge 78 of the partition 200 terminates, as shown at 77, in spaced relation to the bottom member 76. Lugs 12' are carried by the partition 200 and by the adjacent portion of the wall of the tank 10 and on these lugs 12', a screen 35 is mounted. Filtering material 36, which may be waste, is mounted on the screen 35, as indicated at 36, and upon the filtering material 36 is superposed a screen 37, the filtering material being compressed between the screens 35 and 37 by means of strips 12 engaged at their lower ends with the screen 37 and engaged at their upper ends beneath lugs 205 on the partition 200 and on the adjacent wall of the tank 10, the strips being disposed in the compartment 202. The filter comprising the parts 37, 36 and 35 divides the compartment 202 into an upper chamber 11 and a lower chamber 13.

Lugs 16 are carried by the partitions 200 and 201 and by the walls of the tank 10 and are located in the compartment 203. On the lugs 16, a screen 135 is supported, filtering material 136 being placed on the screen, and a screen 137 being superposed on the filtering material. The screen 137 is held down, and the filtering material 136 is compressed, by means of strips 206 engaged beneath lugs 15 on the partitions 200 and 201 and on the wall of the tank 10. The filter 137—136—135 divides the compartment 203 into an upper chamber 14 and a lower chamber 75. A gage glass 44 is mounted on the outside of the tank 10 for the purpose of ascertaining the water level in the chambers 13 and 75, for a purpose to be described hereinafter.

The compartment 204 is divided by a funnel 19 and wing walls 207 into an upper chamber 18 and a lower chamber 18'. Oil can flow from the chamber 14 into the chamber 18 through an opening 17 formed in the partition 201. The funnel 19 communicates with a pipe 20 extended downwardly in the chamber 18' and having a lateral end 80 carried through the side wall of the tank 10, below the bottom 79. A steam pipe 39 is located in the chamber 75 and the ends of the steam pipe are extended laterally as shown in Fig. 3.

An angular guide 82 is mounted on the outside of the tank 10 and on the depending portion of the guide 82, a tube 83 is mounted for vertical sliding adjustment, the tube being held in place by means of a set screw 85. The tube 83 carries a cup 84, the tube having an opening 64, communicating with the interior of the cup. The lower end of the cup 84 discharges into a drain pipe 86 which is carried by the cup, and may be flexible if desired. A flexible conduit 88 communicates with the cup 84 near to the upper edge thereof and communicates with a receptacle 89 secured at 90 to the tank 10, the lower end of the conduit 88 being disposed above a filter, the filter comprising a lower screen 91 in the cup, an upper screen 92 adjustable in the cup, and a quantity of filtering material 93 between the screens. A screw 94 is threaded into the top of the cup 84 and, engaging the upper screen 93, constitutes a means whereby the filtering material 93 may be compressed. A pipe 95 leads to the cup 84, below the filter 91—92—93 and may be supplied with a drain valve 96. The pipe 95 has a lateral arm 97 extended into the tank 10 below the bottom 76, the pipe 97 having an upstanding end 98 projecting into the chamber 75. A drain pipe 40 leads from the bottom 76 and constitutes an outlet for the chambers 13 and 75, the drain pipe being controlled by a faucet 70. The chamber 18', constitutes a receiver for pure oil, and from this receiver, the pure oil may be extracted by means of a draw pipe 43 communicating with the bottom 79 and controlled by a faucet 71.

A casing 21 is located close to the tank 10 and is provided with a removable lid 34, the casing having a false bottom 22. A receptacle 23 is disposed within the casing 21 and is carried by legs 24 supported on the bottom 22. The space 72 between the receptacle 23 and the wall of the casing 21 constitutes a first settling chamber, whereas the space within the receptacle 23 constitutes a second settling chamber. A pipe 41 opens through the bottom of the casing 21 and forms an outlet for the first settling chamber, the pipe controlled by a faucet 73. A pipe 42 enters the bottom of the receptacle 23 and acts as an outlet for the second settling chamber, the pipe 42 being controlled by a faucet 75'.

The casing 21 is bridged by a funnel-shaped partition 25 including a neck 76 extended downwardly into the receptacle 23. The casing 21 carries, externally, a gage glass 45 adapted to indicate the water level in the casing 21, as hereinafter described.

The casing 21 has internal lugs 26, the numeral 27 denoting a screen having notches 307, the construction being such that the screen may be placed between the lugs 26 and then be rotated, so as to be supported on the lowermost ones of the said lugs. On the screen 27 is placed a quantity of special filtering material which may be felt, pulp, cotton, blotting paper, a combination of these materials, or any other suitable substance, the filtering material being indicated at 31 and on the filtering material is disposed a screen 32. The squared portion of a bolt 28 is mounted in the lower screen 27, the bolt 28 being held in the said screen by the head of the bolt and by a pin inserted through the bolt, above the screen 27. The bolt passes slidably through the upper screen 32. A nut 30 is threaded on the bolt 28 and engages the upper screen 32 to effect a compression of the filtering material 31. The nut 30 is received in an opening formed in the lower end of a socket wrench 308, provided at its upper end with a hold 33 adapted to receive a pin or the like (not shown) whereby the wrench, and consequently the nut 30, may be operated.

The tank 10 and the casing 21 are connected by the walls 309 of a receptacle 310. The space in the casing 21, above the screen 32 communicates with the receptacle 310 by way of openings 311, an opening 21' forming a communication between the said space and the chamber 18'. The tank 10 is provided adjacent its bottom 79 with openings 312 to establish communication between the interior of the receptacle 310 and the chamber or receiver 18'.

In practical operation, water is poured into the chamber 11 and passes through the filtering material 36, until the water stands at a level in the chambers 75 and 13. Then a quantity of clean oil is poured into the chamber 14, saturating the filtering material 136. A quantity of dirty oil is poured into the chamber 11 and passes downwardly through the filter 36. A head of dirty oil is created, sufficient to force the water into the chamber 75 and the dirty oil flows upwardly through the water in the chamber 75. The water in the chamber 75 is heated to a considerable degree, owing to the presence of the steam pipe 39, and the oil more or less finely divided, is heated also, and freed of its sediment, it being possible to draw off the sediment, through the pipe 40. The oil, deprived of its sediment, passing upwardly through the filtering material indicated at 136, flows into the chamber 18, by way of the opening 17. As the oil leaves by way of the part 14, the oil sinks in the part 11, and rises in the part 14 to the level of the opening 17.

Suspending temporarily the description of the passage of the oil through the machine, it may be observed that the impure oil cast into the chamber 11 may be mixed with water. A means is provided whereby the water level in the chamber 75 will remain practically unaltered, even though some water, mingled with the impure oil, may pass through the screen 36. In this connection, it is to be observed that should there be an overplus of water, owing to the condition above described, the water will tend to flow through the pipe 98, the pipe 95, the filter 93, and the pipe 88 into the cup 84, the water leaving the cup 84 by way of the hole 64 and the pipe 86. The cup 84 may be raised and lowered on the guide 82, and be held by the set screw 85 in such a position that the mechanism above alluded to will exercise its function as aforesaid, it being possible to compress the filtering material 93 by means of the screw 94 to produce a back pressure which will off set the head of water in the chambers 75 and 13.

It has been pointed out that the oil having passed the filtering material 136, moves through the opening 17 into the chamber 18. Here the oil is received by the funnel 19 and is carried, by way of the pipe 20 and its end 80 into the casing 21 above the bottom 22. Here, the oil is permitted to have an initial settling, and sediment is drawn away through the pipe 41, the pipe 20 affording a sufficient head, so that the oil will rise in the space 72 and enter the receptacle 23, the oil passing upwardly through the neck 76 of the funnel 25, the funnel and its neck being filled with water to the level indicated at X, there being oil on the top of the water. The water and oil may be arranged as above described by permitting a quantity of oil to pass through the opening 17 into the chamber 18 and thence down the pipe 20, a quantity of water being poured into the chamber 18 until the lever X is obtained. If, as above described, there is a quantity of oil between the level X and the filter 31, the oil may accumulate in the chamber 18 to any desired height without disturbing the level at X.

The sediment in the member 23 may be drawn off through the pipe 42. The oil, having passed into the space above the screen 32, flows by way of the opening 21' into the receiver 18'. Likewise, the oil above the screen 32 flows by way of the openings 311 into the receptacle 310 and enters the receiver 18' by the openings 312. An ample space for the storage of filtered oil is provided, and the oil, in a pure condition, may be drawn away at any time through the pipe 43.

Brass tubes 164 communicate with the space below the funnel 25 in the casing 21 and with the space below the perforated plate 27 above the water level shown at X. These tubes permit the egress of air and prevent the oil from becoming water-bound, thereby interfering with the operation of the device. The tubes 164 extend to the top of the tank 10.

There is a baffle B in the cup 84, which prevents oil from flowing too freely to the opening 64.

Having thus described the invention, what is claimed is:—

1. A device of the class described, comprising first and second compartments communicating at their lower ends; filters in said compartments and dividing the same into upper and lower chambers; an outlet for the upper chamber of the second compartment; means for heating the lower chamber of the second compartment; and means for maintaining a column of water at an adjusted head in communication with the lower chamber of the second compartment, thereby to govern the height of the water in the lower chambers when an increment of water is added thereto with the oil which is to be filtered.

2. A device of the class described comprising first, second and third compartments, the first and second compartments communicating adjacent their lower ends; filters in the first and second compartments and dividing them into upper chambers and lower chambers; a partition in the third compartment and dividing the same into an upper chamber and a lower receiver, means for establishing communication between the upper chamber of the third compartment and the upper chamber of the second compartment; and means for establishing communication between the upper chamber of the third compartment and the lower receiver thereof, said means including an auxiliary filtering mechanism.

3. A device of the class described comprising first, second and third compartments, the first and second compartments communicating at their lower ends; filters in the first and second compartments and dividing them into upper chambers and lower chambers; a partition in the third compartment and dividing the same into an upper chamber and a lower receiver; means for establishing communication between the upper chamber of the third compartment and the upper chamber of the second compartment; means for establishing communication between the upper chamber of the third compartment and the lower receiver thereof; an auxiliary filtering mechanism interposed in the last specified means; mechanism for heating the lower chamber of the second compartment; and means for maintaining a governed water level in one of the lower chambers when an increment of water is added with the oil to be filtered.

In testimony that I claim the foregoing as my own, I have hereto affixed my signature in the presence of two witnesses.

JOHN H. PACKER.

Witnesses:
 ANDREW C. HOLT,
 HUGH P. McCLINTIC.